Figure 1:
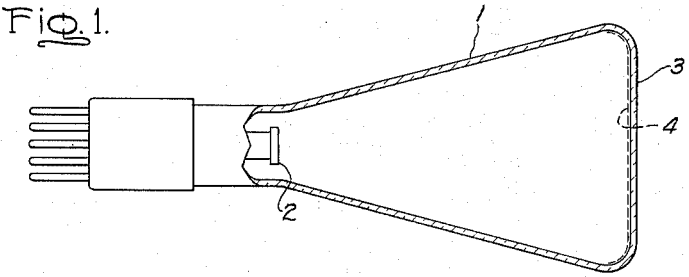

March 22, 1966  T. C. VINCENT  3,242,096
LUMINESCENT NIOBATES
Filed April 9, 1962

Inventor:
Thomas C. Vincent
by Otto Tichy
His Attorney

United States Patent Office 3,242,096
Patented Mar. 22, 1966

3,242,096
LUMINESCENT NIOBATES
Thomas C. Vincent, Mayfield Heights, Ohio, assignor to General Electric Company, a corporation of New York
Filed Apr. 9, 1962, Ser. No. 186,089
8 Claims. (Cl. 252—301.6)

This invention relates to the generation of light by fluorescence and has as its object the provision of a novel source or process of fluorescence for efficient generation of light.

In accordance with the invention, I have discovered that niobates (columbates) of certain metals emit light efficiently when exposed to exciting radiations such as cathode rays, X-rays and ultraviolet rays. More particularly, niobates of calcium and cadmium and mixtures thereof were found to luminesce efficiently. On the other hand, niobates of other Group II metals such as barium, magnesium, strontium and zinc exhibit very little or no luminescence. Moreover, as to niobates of calcium and cadmium and mixtures thereof, useful luminescence is limited to formulations close to the metaniobate composition, and compositions less basic than the metaniobate, that is, those containing less than one mol of calcium or cadmium oxide (or both) per mol of niobium pentoxide. Formulations corresponding to pyro and ortho compositions were virtually nonluminescent.

Good results have been obtained with calcium niobate having a composition in the range of about 0.50 mol to about 1 mol CaO to 1 mol $Nb_2O_5$, with an optimum at about 1 mol CaO per mol $Nb_2O_5$. Good results have also been obtained with cadmium niobate having a composition in the range of about 0.35 mol to about 1 mol CdO per mol $Nb_2O_5$, with an optimum at about 0.55 mol CdO per mol $Nb_2O_5$. The said compositions of calcium and cadmium niobate may be combined in any desired proportions to form a ternary composition of calcium-cadmium niobate. Thus the useful compositions of calcium or cadmium or calcium-cadmium niobates may be expressed as falling in the approximate range of $0.50x$ to $x$ mols CaO and $0.35y$ to $y$ mols CdO per $x$ plus $y$ mols $Nb_2O_5$, where $x$ and $y$ are the same or different arbitrarily chosen positive numbers or zero provided $x$ and $y$ are not simultaneously equal to zero. A ternary composition found to be about optimum contained 0.65 mol CaO, 0.35 mol CdO and 1 mol $Nb_2O_5$.

The niobate compositions may be prepared by firing a mixture of starting materials at a temperature and time suitable to yield the fluorescent product. As starting materials, the calcium and cadmium oxides and niobium pentoxide may be employed as such or as compounds which form those oxides on firing. Preferably the starting materials yielding calcium and cadmium oxides are the corresponding carbonates, and the niobium pentoxide is used as such. The carbonates of calcium and cadmium, and the niobium pentoxide, are dry and mix readily by shaking, rolling or ball milling. It is also possible to mix and compound various salts of each component by a wet process prior to firing. Other materials which break down to yield oxides may be used as batch materials including, for example, nitrates, sulfates, and salts of organic acids.

The firing temperature is not critical, but best results have been obtained in the range of 1000 to 1300° C. with an optimum at about 1100° C. The firing is done in an oxidizing atmosphere in either open or closed containers. In a small batch of, for example, 5 grams, some fluorescence has been obtained by firing for one minute. On the other hand, some batches have been fired for as long as sixteen hours with good results. However, in general, firing times of two to three hours give good results.

By way of example, suitable batch compositions may be prepared by mixing the ingredients in the following proportions: 100 grams of $CaCO_3$ and 266 grams of $Nb_2O_5$ for a calcium niobate; 95 grams of $CdCO_3$ and 266 grams of $Nb^2O_5$ for a cadmium niobate; and 65 grams of $CaCO_3$, 60 grams of $CdCO_3$ and 266 grams of $Nb_2O_5$ for a calcium-cadmium niobate. In each case the batch may be fired for two to three hours at 1100° C. in open vessels in an oxidizing atmosphere.

The phosphors are self-activated and in each case give similar spectral distributions of bright bluish-white luminescence under exposure to cathode rays, X-rays and shorter ultraviolet rays including those of 2537 angstroms wavelength, with a broad emission band peaking at about 4750 to 4800 angstroms, and with a rapid phosphorescent decay. The brightest phosphors are those containing all calcium or only partial substitution of cadmium for calcium. The spectral distribution and brightness are quite similar to those of the commercially well known antimony-activated fluorophosphate phosphor. The phosphors are not effectively excited by long ultraviolet radiations such as those of 3650 angrstroms.

Figure 2:
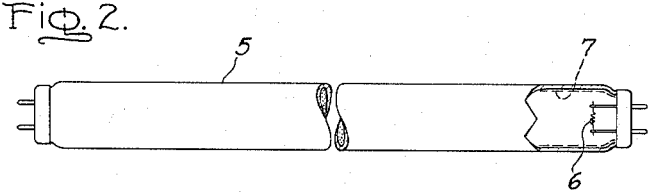

In the drawing, FIG. 1 is a side elevation, partly in section, of a cathode ray tube employing a phosphor screen in accordance with the invention, and FIG. 2 is a similar view of a fluorescent lamp embodying the phosphor.

Referring to FIG. 1, the cathode ray tube may comprise a glass envelope 1 enclosing a cathode ray gun 2 and having on the inner surface of its face plate 3 a coating or layer 4 of a composition including a niobate phosphor in accordance with the invention.

In FIG. 2, the lamp may be of the well known low pressure mercury vapor type comprising a glass envelope 5 having an alkaline earth oxide coated electrode 6 at each end thereof, and containing a filling of starting gas such as argon, krypton, neon, etc., at a pressure of a few millimeters, and a quantity of mercury which, during operation of the lamp, is at a low pressure of the order of 10 microns whereby the gaseous electric discharge between the electrodes emits ultraviolet radiations including those of 2537 angstroms wavelength. The inner surface of the envelope is coated with a layer 7 of a composition including a niobate phosphor according to the invention which is excited to luminescence by the said ultraviolet radiations.

What I claim as new and desire to secure by Letters Patent of the United States is:

1. The method of generating light for useful viewing by exposing fluorescent materials as a surface coating on a transparent substrate selectively to cathode rays, X-rays and ultraviolet rays as a source of exciting radiation wherein the fluorescent material is a niobate of metal of the class consisting of calcium and cadmium and mixtures thereof having a composition in the range of $0.5x$ to $x$ mols CaO and $0.35y$ to $y$ mols CdO per $x$ plus $y$ mols $Nb_2O_5$ where $x$ and $y$ are positive numbers including the cases where $x$ and $y$ are the same number and where one only of $x$ and $y$ is zero.

2. The method of generating light for useful viewing by exposing fluorescent materials as a surface coating on a transparent substrate selectively to cathode rays, X-rays and ultraviolet rays as a source of exciting radiation wherein the fluorescent material is calcium niobate having a composition of about 0.50 to about one mol CaO per mol $Nb_2O_5$.

3. The method of generating light for useful viewing by exposing fluorescent materials as a surface coating on a transparent substrate selectively to cathode rays, X-rays and ultraviolet rays as a source of exciting radiation wherein the fluorescent material is calcium metaniobate.

4. The method of generating light for useful viewing by exposing fluorescent materials as a surface coating on a transparent substrate selectively to cathode rays, X-rays and ultraviolet rays as a source of exciting radiation wherein the fluorescent material is cadmium niobate having a composition of about 0.35 to about one mol CdO per mol $Nb_2O_5$.

5. The method of generating light for useful viewing by exposing fluorescent materials as a surface coating on a transparent substrate selectively to cathode rays, X-rays and ultraviolet rays as a source of exciting radiation wherein the fluorescent material is cadmium niobate having a composition of about 0.55 mol CdO per mol $Nb_2O_5$.

6. The method of generating light for useful viewing by exposing fluorescent materials selectively to cathode rays, X-rays and ultraviolet rays as a source of exciting radiation wherein the fluorescent material is calcium-cadmium niobate having a composition of about 0.65 mol CaO, 0.35 mol CdO and one mol $Nb_2O_5$.

7. A fluorescent calcium-cadmium niobate composition consisting essentially of about 0.65 mol CaO, 0.35 mol CdO and one mol $Nb_2O_5$.

8. A light generating device emitting useful light and of the type comprising a fluorescent material as a surface coating on a transparent substrate exposed to irradiation selectively by cathode rays, X-rays and ultraviolet rays as a source of exciting radiation, wherein the fluorescent material is a niobate of metal of the class consisting of calcium and cadmium and mixtures thereof having a composition in the range of $0.5x$ to $x$ mols CaO and $0.35y$ to $y$ mols CdO per $x$ plus $y$ mols $Nb_2O_5$ where $x$ and $y$ are positive numbers including the cases where $x$ and $y$ are the same number and where one only of $x$ and $y$ is zero.

References Cited by the Examiner
UNITED STATES PATENTS

| 2,752,521 | 6/1956 | Ivey | 252—301.41 |
| 2,853,392 | 9/1958 | Bousky | 23—51 |
| 2,965,786 | 12/1960 | Aia et al. | 252—301.4 |

OTHER REFERENCES

Ballman et al.: "Calcium Niobate Ca(NbO$_3$)$_2$, A New Laser Host Crystal," Journal of Applied Physics, volume 34, No. 11, November 1963, pages 3155–3156.

Coates et al.: "Dielectric Properties of Some Metaniobate and Metantantalates Ceramics," Philosophical Magazine Ser. 8, volume 3, December 1958, pages 1449–1458.

Kroger: "Some Aspects of the Luminescence of Solids," Elsevier Pub. Co., Inc., New York, 1948, page 274.

Lyon et al.: "Some New Infra-Red Phosphors," Journal of the Optical Society of America, March 1950, vol. 40, No. 3, pages 179–180.

Reed: "Phase Equilibria in the System Cadmium Oxide," Journal of Americal Ceramic Society, volume 44, No. 11, November 1961, page 576.

SAMUEL H. BLECH, *Primary Examiner.*

MAURICE A. BRINDISI, *Examiner.*